United States Patent
Osborne et al.

(10) Patent No.: US 7,299,843 B2
(45) Date of Patent: Nov. 27, 2007

(54) PNEUMATIC TIRE CROWN REINFORCEMENT

(75) Inventors: Daniel Grier Osborne, Greer, SC (US); Philippe Esnault, Greenville, SC (US); Matthew Boozer, Easley, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/716,986

(22) Filed: Nov. 19, 2003

(65) Prior Publication Data
US 2004/0108037 A1  Jun. 10, 2004

(51) Int. Cl.
*B60C 9/04* (2006.01)

(52) U.S. Cl. .................. 152/526; 152/527; 152/531

(58) Field of Classification Search ........... 152/527, 152/529, 531, 528, 536, 458, 549, 555, 556, 152/557, 454, 526
See application file for complete search history.

(56) References Cited

U.S. PATENT DOCUMENTS

| | | | | |
|---|---|---|---|---|
| 3,667,529 A | * | 6/1972 | Mirtain .................. | 152/527 |
| 4,155,394 A | * | 5/1979 | Shepherd et al. ........ | 152/527 |
| 4,458,475 A | * | 7/1984 | Schmit et al. ............ | 57/243 |
| 4,623,011 A | * | 11/1986 | Kanuma ................. | 152/451 |
| 5,032,198 A | * | 7/1991 | Kojima et al. ............ | 156/117 |
| 5,397,527 A | * | 3/1995 | Rim et al. ............... | 264/210.8 |
| 5,660,656 A | | 8/1997 | Herbelleauu et al. | |
| 5,968,295 A | * | 10/1999 | Kohno et al. ............ | 152/527 |
| 6,082,423 A | * | 7/2000 | Roesgen et al. ......... | 152/209.1 |
| 6,321,809 B1 | * | 11/2001 | Buenger et al. ......... | 152/526 |
| 6,601,378 B1 | * | 8/2003 | Fritsch et al. ........... | 57/238 |
| 6,634,399 B1 | * | 10/2003 | Sykora et al. ........... | 152/556 |
| 2002/0195185 A1 | * | 12/2002 | Choi et al. .............. | 152/527 |
| 2003/0159768 A1 | * | 8/2003 | Fritsch et al. ........... | 152/556 |

FOREIGN PATENT DOCUMENTS

| | | |
|---|---|---|
| EP | 0 335 588 | 10/1989 |
| EP | 0 346 106 | 12/1989 |
| EP | 0 698 510 | 8/1995 |
| EP | 0 749 854 | 6/1996 |
| EP | 0 790 143 | 2/1997 |
| WO | WO 01/15918 | 3/2001 |

* cited by examiner

*Primary Examiner*—Russell D. Stormer
(74) *Attorney, Agent, or Firm*—E. Martin Remick; Frank J. Campigotto

(57) ABSTRACT

A tire comprising a crown extended by two respective sidewalls and two respective beads, a carcass structure anchored in each side of the tire in said beads, said crown comprising at least one reinforcing ply having parallel reinforcements oriented at an angle α relative to the circumferential direction ranging between 10 and 45 degrees, a first crown reinforcement having cords substantially oriented in the circumferential direction and being high elastic modulus at high stress organic fiber cords, and a second crown reinforcement having cords substantially oriented in the circumferential direction and having a ratio τ of the tensile strength at high strain and high temperature to the tensile strength at low strain and moderate temperatures inferior to 1.5.

33 Claims, 6 Drawing Sheets

PNEUMATIC TIRE CROWN REINFORCEMENT

BACKGROUND OF THE INVENTION

The invention relates to a pneumatic tire for vehicles, in particular a tire the architecture of which is optimized to provide good handling performance while retaining high-speed durability.

The patent application EP 0 790 143 describes a tire comprising a crown extended by two respective sidewalls and two respective beads, a carcass structure anchored in each side of the tire in said beads, said crown comprising at least one reinforcing ply having parallel reinforcements oriented at an angle α relative to the circumferential direction and a first crown reinforcement having cords substantially oriented in the circumferential direction, wherein the first crown reinforcement cords are made of a low elastic modulus organic fiber cord and the crown further comprises a pair of axially spaced edge plies made of high modulus organic fiber cords.

According to this document, the resulting tire has a substantially rounded ground contacting area and, as a consequence, good high-speed durability and handling performance.

It is an object of the invention to provide a tire having an improved control over its crown curvature and its ground contacting area and accordingly, which has improved handling performance while retaining high-speed durability.

BRIEF SUMMARY OF THE INVENTION

According to the present invention, a tire comprises a crown extended by two respective sidewalls and two respective beads, a carcass structure anchored in each side of the tire in said beads, said crown comprising:

- at least one reinforcing ply having parallel reinforcements oriented at an angle α relative to the circumferential direction ranging between 10 and 45 degrees,
- a first crown reinforcement having cords substantially oriented in the circumferential direction and being high elastic modulus at high stress organic fiber cords; and
- a second crown reinforcement having cords substantially oriented in the circumferential direction and the cords having a ratio τ of the tensile strength at high strain and high temperature to the tensile strength at low strain and moderate temperatures inferior to 1.5.

The ply having parallel reinforcements oriented at an angle α and the first crown reinforcement of the tire are designed in order to provide a very good high-speed (over 250 km/h) durability of the tire. In particular, as shown in FIG. 6, these high modulus at high stress cords prevent the ground contacting area 19 of the tire when running at very high speeds from having a center length C inferior to the shoulder length S. On the other hand, the shape of the ground contacting area 20 of the tire of the invention, as illustrated in FIG. 7, stays substantially rectangular or slightly oval. Its center length C' is superior to its shoulder length S'. The second crown reinforcement has the advantage to further flatten the transverse curvature of the outer contour of the crown of the tire when inflated and while running at low and moderate speeds (around and under 150 km/h). This provides improved dry handling and wear performances at low and medium speeds. At very high speeds, due to the high loads and stresses on the circumferential cords and due to the high temperature in the crown the effect of the second crown reinforcement in front of the loads supported by the first crown reinforcement is low and becomes nearly negligible. As a consequence, this second crown reinforcement does not significantly reduce the center length of the ground contacting area of the tire, which could reduce the high speed limit durability.

Advantageously, the second crown reinforcement cords are such that τ<1.0 and preferably τ<0.8. It is very advantageous to choose the cords with the value of τ as low as possible. This allows adjusting nearly independently the properties of the tire at low and moderates speeds and its properties at very high speeds.

According to a first embodiment, the second crown reinforcement is placed axially in the center part of the crown and preferably placed radially outside the first crown reinforcement.

In the case in which the crown of the tire has radially outwardly a tread with a pattern comprising a central rib, the second crown reinforcement is preferably placed axially under this rib.

According to a second embodiment, the first crown embodiment having two lateral parts, the second crown reinforcement is placed axially between these two axial parts. This embodiment advantageously diminishes the thickness of the crown and accordingly the weight and the rolling resistance of the tire.

According to a third embodiment, the cords of the first and second crown reinforcement are alternatingly placed at substantially the same distance from the axis of rotation of the tire. This embodiment has the advantage to be easy to realize and is less expensive from a manufacturing perspective.

According to another embodiments, the at least one reinforcing ply having parallel reinforcements oriented at an angle α relative to the circumferential direction is inserted radially between the first and second crown reinforcements.

The second crown reinforcement can be placed radially inwardly the at least one reinforcing ply having parallel reinforcements oriented at an angle α relative to the circumferential direction. This embodiment has the advantage to improve the handling properties of the tire at low and moderate speeds.

The first crown reinforcement can alternatively be placed radially inwardly the at least one reinforcing ply having parallel reinforcements oriented at an angle α relative to the circumferential direction. This embodiment has the advantage to lower the static stresses supported by the first crown reinforcement cords.

The tires of the invention, being in a similar position as when mounted on their design mounting rims, inflated at a nominal pressure and unloaded, have preferably the outer contour of their crown portion having a transverse concave profile with a substantially constant radius of curvature over 1.0 meter.

The cords of the second crown reinforcement have advantageously a diameter D between 0.5 and 1.5 mm and preferably between 0.7 and 1.2 mm. Their laying pitch p is advantageously such that D/p is between 0.5 and 0.9 and preferably between 0.7 and 0.9.

Preferably the tensile strength of the second crown reinforcement cords at a strain of 2.5% and a temperature of 180 Celsius degrees is inferior to 2 daN and preferably inferior to 1.5 daN. The tensile strength of the second crown reinforcement cords at a strain of 1% and a temperature of 80 Celsius degrees is preferably superior to 2 daN. This ensures that the ratio τ is under 1 and that the effect of the second crown reinforcement at high speed, i.e. at high temperature and stress is really negligible in front of the rigidity of the first crown reinforcement.

Such cords can be chosen in the group of PET and PEN polyesters with preferably PET polyesters. Preferably, said PET polyesters have a stress-strain characteristic with two maxima of tangent modulus, the strain of the second maxima being over 12% and preferably over 14%.

An example of such cords are PET HMLS (high modulus low shrinkage) cords with a high temperature contraction potential (CS) under 1%.

The high elastic modulus at high strain cords can comprise nylon yarns associated with aramid yarns. They can also comprise only aramid cords.

The substantially circumferential oriented cords are preferably helically wound. Advantageously, the laying diameters of said cords depart by less than 0.5% from the final diameters of said cords in the tire after vulcanization.

The tire of the invention is advantageously built on a rigid core having a crown portion and side portions wherein the outer contour of the crown portion is substantially cylindrical. This has the advantage to lower the static belt breaker edges stresses.

DEFINITIONS

Figure 1A:
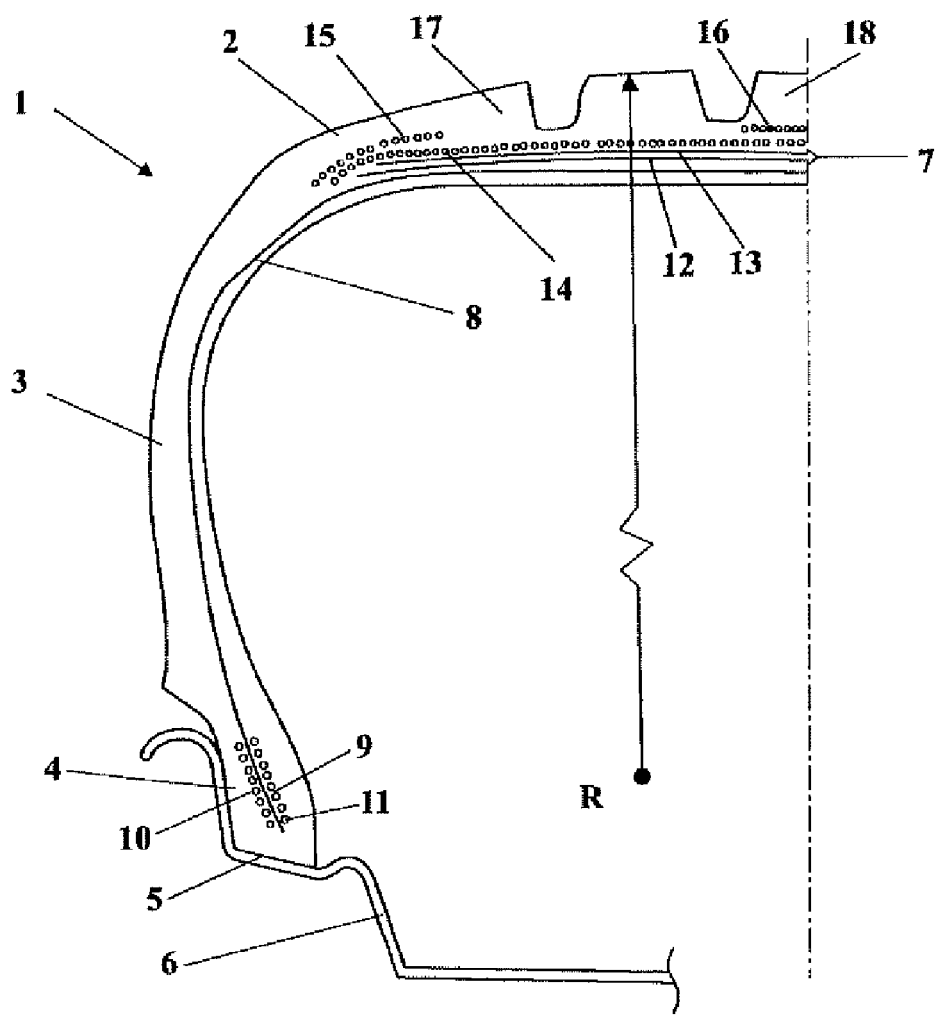
FIG. 1A is a partial transverse cross section of a pneumatic tire according to the invention and FIG. 1B is a partial perspective view of belts in a pneumatic tire.

"Axial" and "axially" mean the lines or directions that are parallel to the axis of rotation of the tire.

"Circumferential" means lines or directions extending along the perimeter of the surface of the annular tread perpendicular to the axial direction.

"Equatorial plane (EP)" means the plane perpendicular to the tire's axis of rotation and passing through the center of its crown.

"Radial" and "radially" mean directions radially toward or away the axis of rotation of the tire.

"Cord" means both monofilaments and multifilaments, of assemblies such as cables, plied yarns or any other type of equivalent assemblies, and this regardless of the material or treatment of these cords, for example, surface treatment or coating or dipping to promote adhesion to the rubber mixes.

"Compound" means a rubber mix having one or more base elastomer and additives selected in accordance with the properties of the compound desired for the zone of the tire it is used.

"Modulus of elasticity" of a rubber mix means the extension secant modulus at a strain of 10% and a temperature of 20 degrees Celsius.

"Linear density" applied to a cord is the weight in grams per 1000 meters of the cord, stated of units of "tex".

"Modulus of elasticity" of a cord at a given strain or stress means the extension secant modulus calculated at the given strain or stress. The units used for the stress on a cord or the modulus of elasticity of a cord are centi-newton per tex (cN/tex). A high elastic modulus is considered as a secant elastic modulus over 1000 cN/tex and a low elastic modulus is considered as a secant elastic modulus under 600 cN/tex.

"Tangent modulus of elasticity" of a cord at a given strain or stress means the extension tangent modulus of said cord. At a given stress or strain, the tangent modulus of elasticity is the value of the slope of the tangent to the stress-strain curve.

"Winding pitch, p" applied to a substantially circumferentially oriented cord which is helically wound particularly in a large-diameter helical having as its main axis the main axis of the tire, is the transverse distance between the cord axes of the cords of two adjacent loops in the helical. "Laying density, d" is the reciprocal of the winding pitch and thus corresponds to the number of loops of a helically wound cord per unit axial length (along the main axis of the winding). Customarily, d is stated as the number of cords per decimeter (units of 1/dm), and p is stated in units of millimeters. Thus p=100/d.

The "high-temperature contraction potential" called "CS" means the relative variation of length of a dipped cord positioned, under a prestress equal to the half-sum of the titers of each of the elementary fibers, between the shelves of an oven (TESTRITE type) regulated at a constant temperature of 185±0.5° C. The CS is expressed in % by the following formula: CS (%)=100×|$L_1-L_0$|/$L_0$ where $L_0$ is the initial length of the dipped cord at room temperature under a prestress equal to the half-sum of the titers of each of the elementary fibers and $L_1$ the length of that same cord at 185° C. The length $L_1$ is measured at the end of a stabilization time of the cord at temperature of 185° C. equal to 120 s±2%. The standard deviation on the CS measurement is ±0.15%.

That potential is the direct consequence of the series of operations that the reinforcements underwent on its manufacture or on its use.

DETAILED DESCRIPTION OF THE INVENTION

Figure 1B:
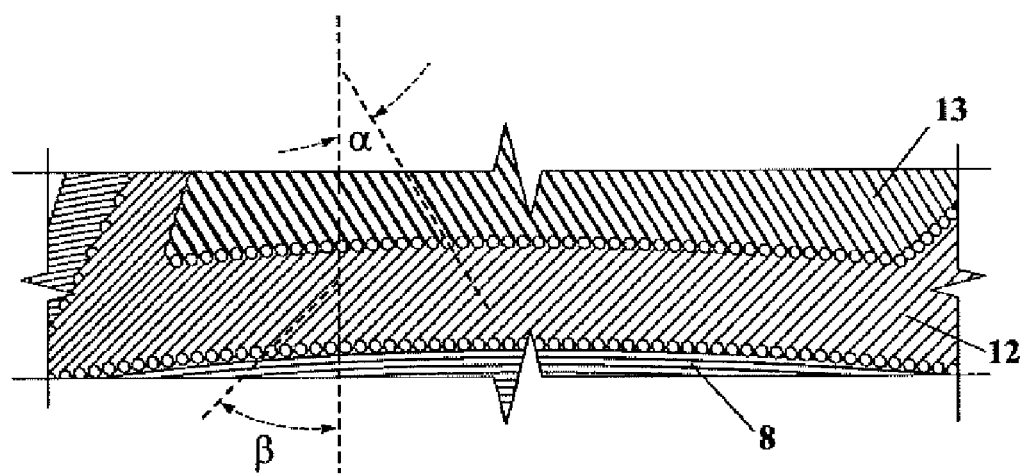

FIG. 1 is a partial transverse cross section of a pneumatic tire 1 according to the invention. This tire comprises a crown 2 extending to sidewall 3 and bead 4. The bead 4 has a seat 5 adapted to fit on the tire's design mounting rim 6. The crown comprises a breaker belt 7.

The tire comprises a carcass structure 8, extending from bead to bead or leaving a gap between two half structures, for instance in the substantially median portion of the crown. The radially inwardmost extent of the carcass structure 8 terminates in an anchoring zone 9 of the bead 4. In the embodiment of FIG. 1, the carcass structure is not turned up around bead cores or other bead reinforcement. The carcass structure is anchored in the bead portion by bead reinforcement. A preferred embodiment of such reinforcement comprises a cord arrangement provided with at least one substantially circumferentially oriented cord 11 laterally bordering the carcass structure on at least one side. In the embodiment of FIG. 1, there are two circumferentially oriented cord windings 10 and 11 laterally bordering the carcass structure 8 on both sides. In this instance "anchored" in the bead portion means that the arrangement resists the tension developed in the carcass structure during inflated or deflated use of the tire by the adherence of the carcass reinforcing structure laterally with the cords 10 and 11 rather than being wound around a traditional bead core.

The mechanical properties of the anchoring zone 9 are optimized in using a bead filler having a very high creeping resistance at high stress and temperature.

Other examples of carcass anchorings or dispositions of the carcass layers in the bead portion have been disclosed in U.S. Pat. No. 5,660,656 to Herbelleau et al and are incorporated herein by reference.

The tire of the invention advantageously utilizes a bead anchoring as described, but the carcass structure may also be turned up around bead cores.

The crown 2 comprises:
- a carcass structure 8;
- reinforcing plies forming a breaker belt 7 disposed radially outside the carcass structure 8 and having in this embodiment two crossed plies 12, 13 of high elastic modulus at high stress cords, laid at angles $\alpha$, $\beta$, from 27 to 37 degrees with respect of the circumferential rolling direction in parallel to each other but crosswise to the cords of the next ply, here $\alpha$, $\beta$ are in the order of +33 and −33 degrees, respectively; these cords are advantageously made of steel but aramid cords can also be used;
- a first crown reinforcement having an outer full-width ply 14 having cords substantially oriented in the circumferential direction made of high elastic modulus at high stress organic fiber cord;
- two edge plies 15 made of high elastic modulus at high stress cords, which are substantially circumferentially oriented;
- a second crown reinforcement having a center ply 16 made of low elastic modulus at high stress fiber cord oriented substantially in the circumferential direction and placed in the center part of the crown; and
- a tread 17 with a central rib 18.

The carcass structure is substantially oriented radially, i.e. at 90 degrees to the circumferential direction. The ply 16 is advantageously placed axially under the central rib 18 of the tread 17.

The plies 14 and 15 are made of high elastic modulus at high stress cords, which are helically wound in order to ensure a good stiffening hoop effect of the crown 2. These plies are preferably made of aramid cords, hybrid cords that associate nylon yarn and aramid yarns may also be used. The pitch p of these plies is determined in order to have a very good high-speed durability.

The center ply 16 is made of a low elastic modulus at high stress cord, which is also helically wound. This cord is preferably a thermally contractible cord such as PET. Nylon cord may also be used.

Figure 7:
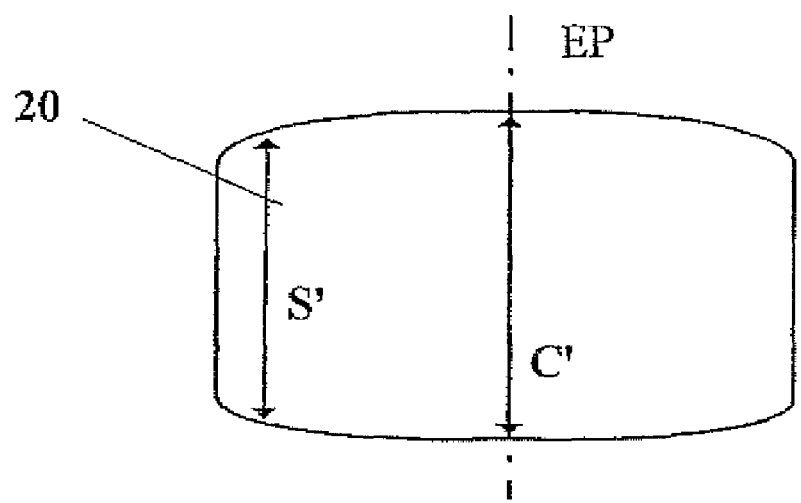
FIG. 7 is a diagram showing the ground contacting area of the tire of the invention.

When the tire is mounted on its design mounting rim 6, inflated to its nominal pressure but unloaded, the full-width ply 14, in combination with the edge plies 15, the center ply 16 and the angles $\alpha$ and $\beta$ of the two crossed plies, provide the outer contour of the crown with a concave curvature which is substantially constant. The value of the radius of curvature R is about or over 1 meter. When loaded, the resulting ground contact area form 20 is substantially rectangular or slightly oval shaped as illustrated in FIG. 7. It has been found that such a rectangular shape 20 provides the tire with very good low or medium speeds dry handling and wear performances and good wet handling performances.

When the tire speed increases and reaches very high speeds, the centrifugal forces become very high, accordingly, the cords and the pitch p of the plies 14 and 15 are determined in order to be able to resist to these forces and to provide the ground contacting area with substantially always a rectangular/oval shape as presented in FIG. 7. This shape provides the tire with a very good high-speed durability.

The very high speed running of the tire imparts a high temperature in the crown due to the hysteresis of the compounds of the tire and notably of the tread. At this high temperature and under the high loads and stresses due to the high centrifugal forces, the stiffness of the center ply 16 becomes nearly negligible in front of the high stiffness of the high modulus plies 14 and 15. As a consequence, the additional crown reinforcement does not limit the length of the centerline (intersection with EP) of the ground contacting area of the tire.

Accordingly, the combination of the characteristics of the plies in the crown of the inventive tire provides it with an improved dry handling and wear performances at low and medium speeds while retaining a very good high-speed durability.

Figure 2:
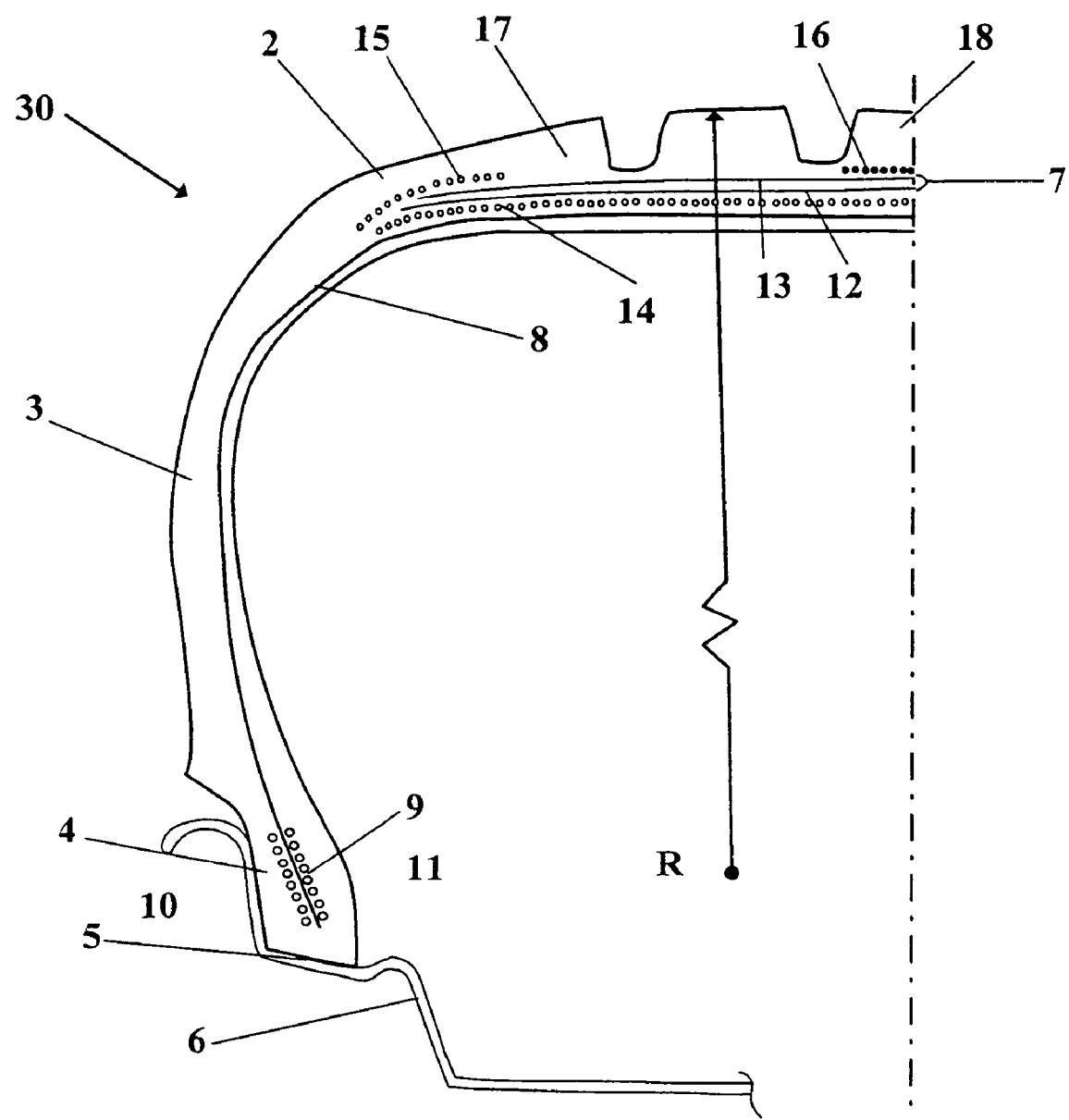
FIG. 2 is a partial transverse cross section of a second embodiment of an inventive tire.

FIG. 2 presents a second embodiment of a tire 30 according to the invention in which the full-width ply 14 is placed radially under the breaker belt 7. This position improves the efficiency of the hoop effect of the circumferentially oriented cords of the ply 14.

Figure 3:
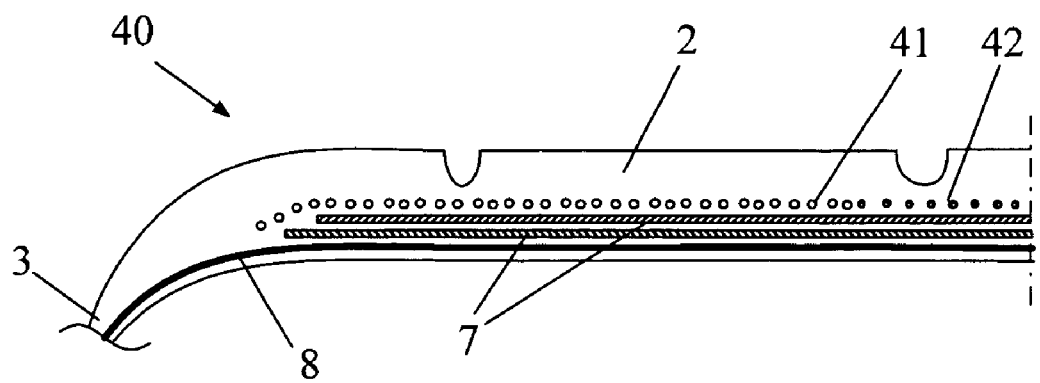
FIG. 3 is a partial transverse cross section of a third embodiment of an inventive tire.

FIG. 3 presents a third embodiment of a tire 40 according to the invention in which, the first crown embodiment 41 having two lateral parts, the second crown reinforcement 42 is placed axially between these two axial parts 41. This embodiment advantageously diminishes the thickness of the crown and accordingly the weight and the rolling resistance of the tire.

Figure 4:
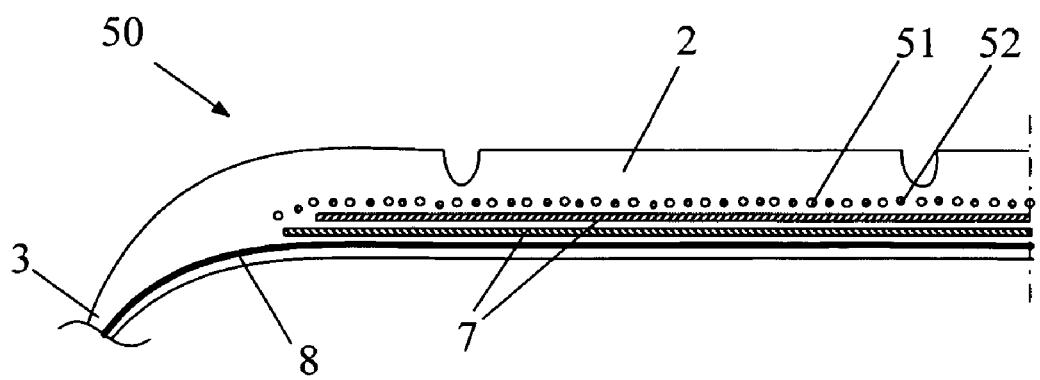
FIG. 4 is a partial transverse cross section of a fourth embodiment of an inventive tire.

FIG. 4 presents a fourth embodiment of a tire 50 according to the invention in which the cords of the first 51 and second 52 crown reinforcement are alternatingly placed at substantially the same distance from the axis of rotation of the tire. This embodiment has the advantage to be easy to realize and is less expensive from a manufacturing perspective.

Figure 5:
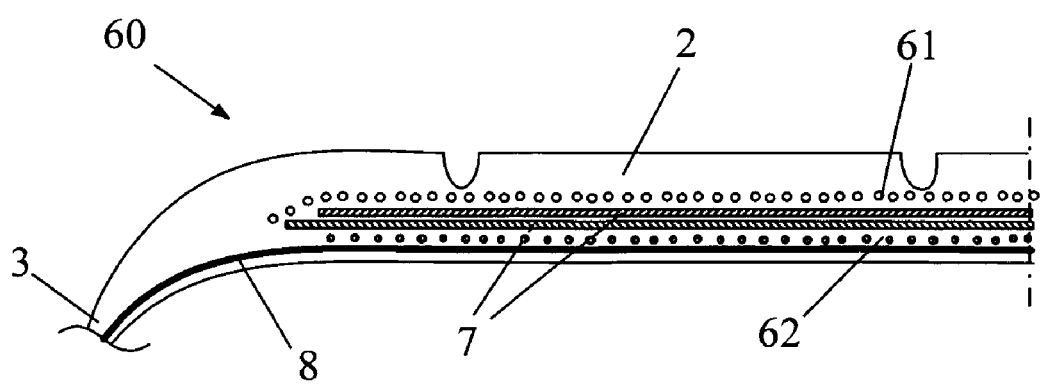
FIG. 5 is a partial transverse cross section of a fifth embodiment of an inventive tire.
Figure 6:
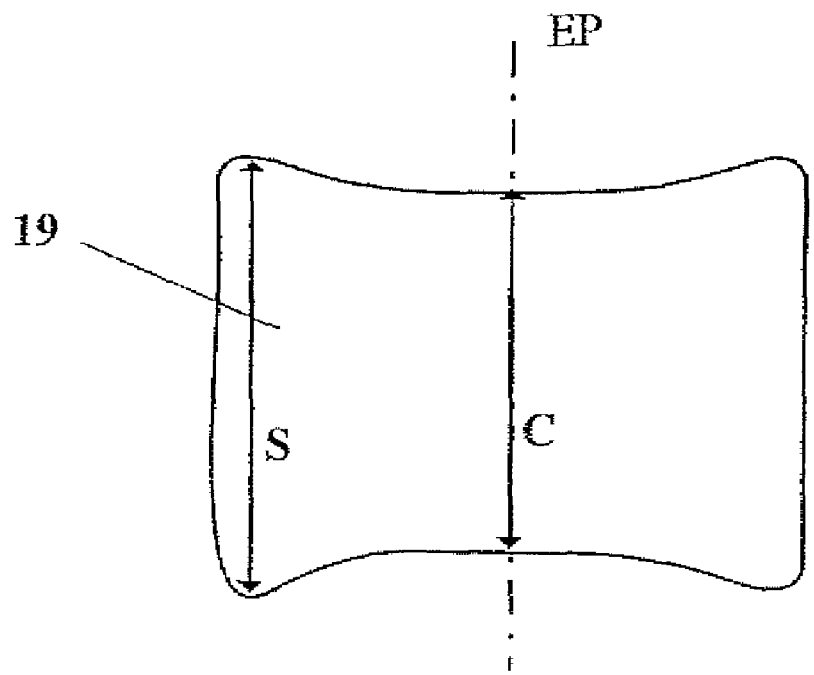
FIG. 6 is a diagram showing the ground contacting area of a prior art tire running at high speeds.

FIG. 5 presents a fifth embodiment of a tire 60 according to the invention in which the breaker belt 7 is inserted radially between the first 61 and second 62 crown reinforcements. In this embodiment, the second crown reinforcement 62 is also placed radially inwardly the breaker belt 7. This embodiment has the advantage to improve the handling properties of the tire at low and moderate speeds.

Figure 8:
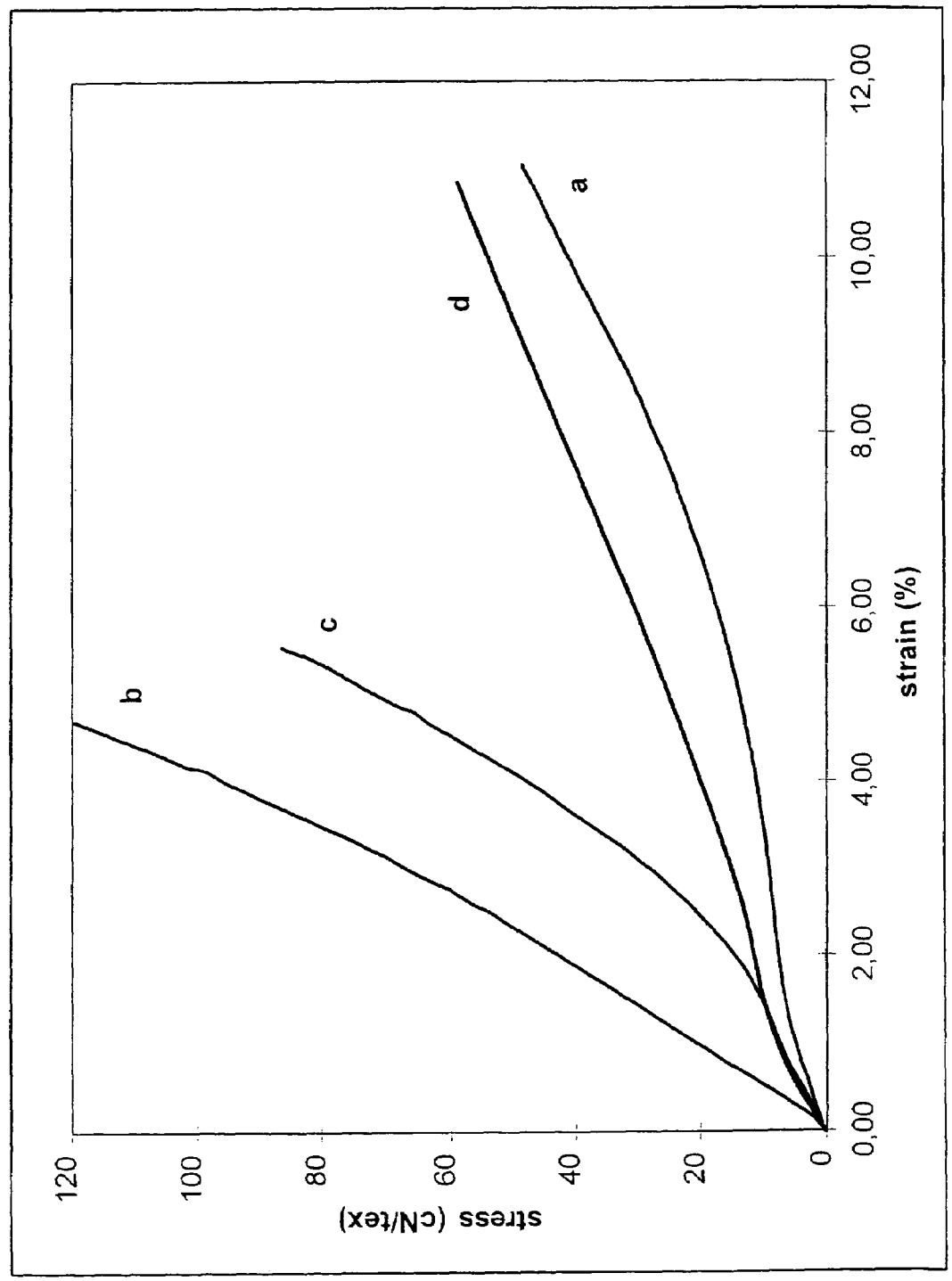
FIG. 8 is a plot of stress versus elongation for four types of cords.

FIG. 8 presents the stress-elongation curves of four cords:
- curve a: nylon cord (two yarns of nylon);
- curve b: aramid cord (two aramid yarns);
- curve c: aramid-nylon cord; and
- curve d: polyester (PET) cord.

The nylon cord (curve a) is a dipped cord of 441 tex made from two identical nylon yarns of 210 tex individually twisted at 200 t/m in a first direction then simultaneously twisted at 200 t/m in the opposite direction. The initial modulus of elasticity of this cord is 530 cN/tex, the stress at a 4% elongation is 10 cN/tex and its modulus of elasticity at this strain is 250 cN/tex. Thus the modulus of elasticity of this cord is low at low deformations as well as at appreciable deformations or stresses.

The aramid cord (curve b) is a dipped cord of 376 tex made from two identical aramid yarns of 167 tex individually twisted at 440 t/m in a first direction then simultaneously twisted at 440 t/m in the opposite direction. The initial modulus of elasticity of this cord is 2030 cN/tex, the stress at a 4% elongation is 80 cN/tex and its modulus of elasticity at this strain is 2000 cN/tex. This cord is characterized by a high modulus of elasticity at low and high stresses.

The aramid-nylon cord (curve c) is a dipped cord, which has a linear density of 521 tex. It is made from two identical aramid yarns of 167 tex individually twisted at 280 t/m (turns per meter) in a first direction and from one yarn of 140 tex twisted at 280 t/m in the same direction, these three yarns being further simultaneously twisted at 280 t/m in the opposite direction. The initial modulus of elasticity of this cord is 740 cN/tex, the stress developed at a 4% elongation is 50 cN/tex and the modulus of elasticity at this strain is 1250 cN/tex. This cord has a medium modulus of elasticity at low elongation but a high modulus at high stress or elongation.

The PET cord (curve d) is a dipped cord, which has a linear density of 680 tex. It is made from four identical PET yarns of 167 tex. In a first stage, the yarns are assembled and twisted two by two at 200 t/m (turns per meter) in a first direction, then simultaneously twisted at 200 t/m in the opposite direction. The initial modulus of elasticity of this cord is 750 cN/tex but the stress developed at a 4% elongation is 20 cN/tex, the modulus of elasticity at this strain of 4% is 500 cN/tex. This cord has a medium modulus of elasticity at low elongation and a low modulus at high stresses or elongation.

The following table 1 gives the mechanical properties of these four cords at 20 Celsius degrees:

TABLE 1

| Cord | Nylon (a) | Aramid (b) | Aramid-nylon (c) | PET (d) |
|---|---|---|---|---|
| Initial modulus of elasticity (cN/tex) | 530 | 2030 | 740 | 750 |
| Modulus of elasticity at 4% strain (cN/tex) | 250 | 2000 | 1250 | 500 |

The curves b and c illustrate the behavior of cords that may be used for the full-width ply and the edge plies of the crown. The high modulus of elasticity of these cords allows them to very well support the high centrifugal forces without the necessity of a high linear density of plies or of numerous plies.

The curves a and d illustrate the behavior of cords that may be used for the additional crown reinforcement. The pitch used for the center ply is determined in order to allow this ply to have a significant flattening influence on the transverse curvature of the crown of the tire at low or medium operating speeds. Obviously, the PET cord is preferable due to its higher low elongation modulus.

At high stresses or high strains, the cords a and d have a much lower modulus of elasticity than the aramid cords (curves b and c). This explains that the influence of the additional crown reinforcement is nearly negligible at very high speed running conditions. The difference is further increased by the different behavior of the nylon an PET cords with temperature. These curves are obtained at 20 Celsius degrees. At high temperatures, such as the temperatures reached in very high speed running conditions, these cords have an important diminution of their modulus of elasticity at high (and low) stresses. On the contrary, the aramid cords encounter a much lower decrease.

Figure 9:
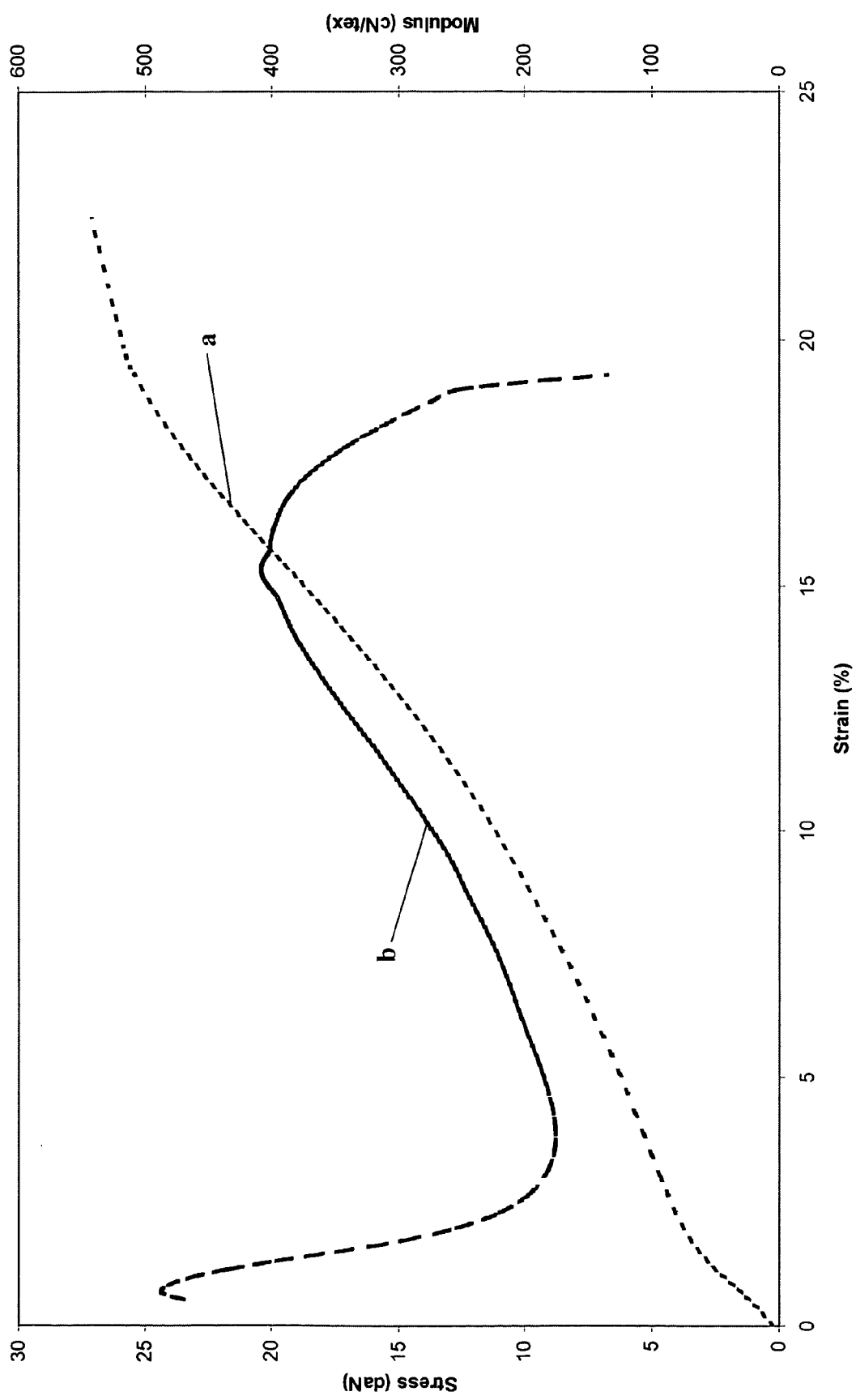
FIG. 9 is a plot of stress and tangent modulus versus strain for a PET cord.

FIG. 9 is a plot of stress (a) and tangent (b) modulus versus strain for a PET cord. The PET cord has a stress-strain characteristic with two maxima of tangent modulus, the strain of the second maxima being over 14%.

To demonstrate the invention, two 225/55 17 Pilot Sport® A/S model tires were manufactured, one with and one without an additional center crown reinforcement. The test results are presented in the following table 2.

TABLE 2

| Center ply | Wear resistance | Subjective Wet handling | Subjective Dry handling | Inflated R (m) |
|---|---|---|---|---|
| No | 100 | 100 | 100 | 0.6 |
| PET | 125 | 100 | 110 | 1.3 |

The tire according to the invention presents a very good wear resistance and subjective dry handling performances. It has also a good subjective wet handling performance similar to the performance of the reference tire.

It is advantageous to build the tire of the invention on a rigid support, for instance a rigid core imposing the shape of its inner cavity. All the components of the tire, which are disposed directly in their final place, are applied onto this core in the order required by the final architecture, without undergoing shaping at any moment of the building. In this case, the tire can be molded and vulcanized in the manner explained in U.S. Pat. No. 4,895,692.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A tire comprising a crown extended by two respective sidewalls and two respective beads, a carcass structure anchored in each side of the tire in said beads, said crown comprising:
   at least one reinforcing ply having parallel reinforcements oriented at an angle α relative to the circumferential direction ranging between 10 and 45 degrees;
   a first crown reinforcement having cords substantially oriented in the circumferential direction and being high elastic modulus at 4% strain organic fiber cords; and
   a second crown reinforcement having cords substantially oriented in the circumferential direction and having a ratio τ of the tensile strength at a strain of 2.5% and a temperature of 180° C. to the tensile strength at a strain of 1% at 80° C. inferior to 1.5, the second crown reinforcement further being low elastic modulus at 4% strain cords, wherein neither the first nor the second crown reinforcements are edge plies.

2. The tire of claim 1, wherein τ<1.0.

3. The tire of claim 1, wherein τ<0.8.

4. A tire according to claim 1, wherein said second crown reinforcement is placed axially in the center part of the crown.

5. A tire according to claim 1, wherein said second crown reinforcement is placed radially outside the first crown reinforcement.

6. The tire of claim 5, wherein, said crown having radially outwardly a tread with a pattern comprising a central rib, said second crown reinforcement is placed axially under said rib.

7. A tire according to claim 1, wherein, the first crown reinforcement having two lateral parts, the second crown reinforcement is placed axially between said two lateral parts.

8. A tire according to claim 1, wherein the first and second crown reinforcements are alternating placed at substantially the same distance from the axis of rotation of the tire.

9. A tire according to claim 1, wherein the at least one reinforcing ply having parallel reinforcements oriented at an angle α relative to the circumferential direction is inserted radially between the first and second crown reinforcements.

10. The tire of claim 9, wherein the first crown reinforcement is placed radially outwardly the at least one reinforcing ply having parallel reinforcements oriented at an angle α relative to the circumferential direction.

11. The tire of claim 9, wherein the second crown reinforcement is placed radially outwardly the at least one reinforcing ply having parallel reinforcements oriented at an angle α relative to the circumferential direction.

12. A tire according to claim 1, wherein said crown comprises two crossed reinforcing plies of high elastic modulus cords laid at an inclination angle from 27 to 37 degrees with respect to the circumferential direction.

13. A tire according to claim 1, wherein, the tire being in a similar position as when mounted on its design mounting rim, inflated at a nominal pressure and unloaded, the outer contour of the crown portion of the tire has a transverse concave profile with a substantially constant radius of curvature over 1.0 meter.

14. A tire according to claim 1, wherein the second crown reinforcement cords have a diameter D between 0.5 and 1.5 mm.

15. A tire according to claim 14, wherein the second crown reinforcement cords have a diameter D between 0.7 and 1.2 mm.

16. A tire according to claim 1, wherein, the second crown reinforcement cords having a diameter D, said second crown reinforcement cords are placed with a laying pitch p such that D/p is between 0.5 and 0.9.

17. A tire according to claim 16, wherein, the second crown reinforcement cords having a diameter D, said second crown reinforcement cords are placed with a laying pitch p such that D/p is between 0.7 and 0.9.

18. A tire according to claim 1, wherein the tensile strength of the second crown reinforcement cords at a strain of 2.5% and a temperature of 180 Celsius degrees is inferior to 2 daN.

19. A tire according to claim 18, wherein the tensile strength of the second crown reinforcement cords at a strain of 2.5% and a temperature of 180 Celsius degrees is inferior to 1.5 daN.

20. A tire according to claim 1, wherein the tensile strength of the second crown reinforcement cords at a strain of 1% and a temperature of 80 Celsius degrees is superior to 2 daN.

21. A tire according to claim 1, wherein the second crown reinforcement cords are chosen in the group of the PET and PEN polyesters.

22. The tire of claim 21, wherein the second crown reinforcement cords are PET polyester cords.

23. The tire of claim 22, wherein said PET polyester cords have a stress-strain characteristic with two maxima of tangent modulus, the strain of the second maxima being over 12%.

24. The tire of claim 23, wherein the second crown reinforcement cords are PET HMLS cords with a high-temperature contraction potential under 1%.

25. The tire of claim 23, wherein said PET polyester cords have a stress-strain characteristic with two maxima of tangent modulus, the strain of the second maxima being over 14%.

26. A tire according to claim 1, wherein said high elastic modulus at high strain cords comprise nylon yard associated with aramid yarn.

27. A tire according to claim 1, wherein said high elastic modulus at high strain cords comprise aramid cords.

28. A tire according to claim 1, wherein the substantially circumferential oriented cords are helically wound.

29. The tire of claim 28, wherein said substantially circumferential oriented cords are helically wound with laying diameters departing by less than 0.5% from the final diameters of said cords in the tire after vulcanization.

30. A tire according to claim 1, wherein said tire is built on a rigid core having a crown portion and side portions, and wherein the outer contour of said crown portion of the core is substantially cylindrical.

31. A tire according to claim 1, wherein a high elastic modulus is a secant elastic modulus over 1000 cN/tex.

32. The tire of claim 1, wherein the crown further comprises a pair of axially spaced edge plies.

33. The tire of claim 32, wherein said pair of axially spaced edge plies is made of cords of high elastic modulus at 4% strain and is substantially circumferentially oriented.

* * * * *